(12) United States Patent
Sakamoto et al.

(10) Patent No.: US 7,879,497 B2
(45) Date of Patent: Feb. 1, 2011

(54) BATTERY

(75) Inventors: Hiroyuki Sakamoto, Aichi-ken (JP); Kazuhiro Ohkawa, Aichi-ken (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1028 days.

(21) Appl. No.: 11/704,341

(22) Filed: Feb. 9, 2007

(65) Prior Publication Data

US 2007/0224512 A1 Sep. 27, 2007

(30) Foreign Application Priority Data

Mar. 27, 2006 (JP) ............................. 2006-086090

(51) Int. Cl.
*H01M 4/80* (2006.01)

(52) U.S. Cl. ...................... 429/235; 429/245

(58) Field of Classification Search ................ 429/235, 429/236, 245
See application file for complete search history.

(56) References Cited

U.S. PATENT DOCUMENTS

| | | | |
|---|---|---|---|
| 4,251,603 A | 2/1981 | Matsumoto et al. | |
| 5,700,596 A | 12/1997 | Ikoma et al. | |
| 5,800,947 A | 9/1998 | Köhler et al. | |
| 6,465,133 B1 | 10/2002 | Kariya et al. | |
| 7,736,795 B2 * | 6/2010 | Sakamoto et al. | 429/245 X |
| 2003/0232247 A1 | 12/2003 | Loffler et al. | |

FOREIGN PATENT DOCUMENTS

| | | |
|---|---|---|
| DE | 102 20 486 C1 | 9/2003 |
| EP | 0 392 082 A2 | 10/1990 |
| EP | 0 523 284 A2 | 1/1993 |
| EP | 0 694 981 A1 | 1/1996 |
| EP | 1 056 144 A2 | 11/2000 |
| JP | A 2001-093505 | 4/2001 |
| JP | A 2001-313066 | 11/2001 |
| JP | A 2002-260719 | 9/2002 |

* cited by examiner

*Primary Examiner*—Stephen J. Kalafut
(74) *Attorney, Agent, or Firm*—Oliff & Berridge, PLC

(57) ABSTRACT

A battery is adapted such that a nickel hydroxide particle group constituted of a number of nickel hydroxide particles filled in a void part of a positive electrode substrate contains, at a ratio of 15 wt % or less, small-diameter nickel hydroxide particles each having a particle diameter of 5 μm or less. The positive electrode substrate is configured such that a front-surface-side nickel layer and a back-surface-side nickel layer are made larger in thickness than a middle nickel layer, and an average thickness B of either the front-surface-side nickel layer or the back-surface-side nickel layer, which is thicker one, and an average thickness C of the middle nickel layer satisfy a relation of $C/B \geq 0.6$.

2 Claims, 11 Drawing Sheets

BATTERY

BACKGROUND OF THE INVENTION

1. Field of the Invention

The present invention relates to a battery.

2. Description of Related Art

Various types of batteries have been developed in recent years. For example, a nickel-metal hydride storage battery has rapidly come into wide use as a secondary battery with a high energy density and a high reliability.

This nickel-metal hydride storage battery has been known as e.g. a rectangular sealed nickel-metal hydride storage battery comprising an electrode plate assembly that includes a plurality of positive electrode plates and a plurality of negative electrode plates alternately laminated with separators interposed one by one between them, and a rectangular parallelepiped battery case containing the electrode plate assembly (e.g., JP-A-2001-313066, JP-A-2001-93505, and JP-A-2002-260719).

In the above nickel-metal hydride storage battery, the positive electrode plate includes for example a positive electrode plate produced in a manner that a positive electrode substrate made of foamed nickel (made by plating nickel on a skeleton surface of an urethane foam and then burning the urethane foam) is filled with a mix material for positive electrode (hereinafter, "positive mix material") containing a positive active material.

Meanwhile, the foamed nickel is concretely made by the method in which a foamed urethane substrate is coated with a thin electroless nickel plating and then immersed in an electrolytic nickel plating solution in which a predetermined mount of current is supplied to a front-surface-side electrode placed facing the front surface of the foamed urethane substrate and a back-surface-side electrode placed facing the back surface of the foamed urethane substrate, thereby coating the surface of a skeleton constituting the foamed urethane substrate with the electrolytic nickel plating. Consequently, a nickel layer formed on the urethane skeleton of a middle portion of the foamed urethane substrate in its thickness direction is apt to be thinner than a nickel layer formed on the urethane skeleton of an upper part of the foamed urethane substrate closer to the front surface thereof and a nickel layer formed on the urethane skeleton of a lower part of the same closer to the back surface thereof. For example, an average thickness of the nickel layer in the middle portion would be about 50% of that of the nickel layer in the upper or lower part. After the foamed urethane is burned off, a foamed nickel obtained would have a thinner nickel layer in the middle portion (e.g. an average thickness of about 50%) than those in the parts close to the front surface and the back surface.

In the case where the positive electrode substrate is made of the foamed nickel, having a thin nickel layer in the middle portion as above, the positive electrode plate (the positive electrode substrate) will have a low current collecting property in the middle portion. The positive electrode substrate could not entirely have a good current collecting property. To solve such problem, there has been known a technique using nickel hydroxide powder that is to be filled in pores (a void part) of the positive electrode substrate and has a small particle diameter (e.g. a particle diameter of 5 µm or less) in relatively large amounts (e.g. 20 wt % or more) in order to provide a wide particle size distribution with an average particle diameter of about 10 µm (see JP-A-6(1994)-349489). By using this technique, the gaps between the nickel hydroxide particles each having a large particle diameter are filled with the small-diameter nickel hydroxide particles to increase a filling amount of the nickel hydroxide particles while providing a good conductive path between the nickel hydroxide particles to enhance the current collecting property of the positive electrode plate.

However, the nickel hydroxide will change to inert γ-type nickel oxyhydroxide in association with repeated charge and discharge cycles. Increased γ-type nickel oxyhydroxide may cause expansion of the positive electrode plate and decrease of an electrolyte in each separator, which shortens the battery life. In particular, the nickel hydroxide particles each having a small particle diameter (e.g. a particle diameter of 5 µm or less) are likely to change to γ-type nickel oxyhydroxide in association with the repeated charge and discharge. Accordingly, in the case where the nickel hydroxide powder containing a relatively large amount (e.g. 20 wt % or more) of the small-diameter nickel hydroxide particles (e.g. a particle diameter of 5 µm or less) as mentioned above, the γ-type nickel oxyhydroxide is apt to particularly increase due to repeated charge and discharge, which may significantly shorten the battery life.

SUMMARY OF THE INVENTION

The present invention has been made in view of the above circumstances and has an object to provide a battery with an excellent current collecting property and a good life characteristic.

To achieve the purpose of the invention, there is provided a battery comprising a positive electrode plate including: a positive electrode substrate made of nickel and including a nickel skeleton of a three-dimensional network structure having a void part formed of a number of pores three-dimensionally connected, the positive electrode substrate having a front surface and a back surface, and a nickel hydroxide particle group including a number of nickel hydroxide particles filled in the void part of the positive electrode substrate; wherein the nickel hydroxide particle group includes, at a ratio of 15 wt % or less, nickel hydroxide particles each having a particle diameter of 5 µm or less, and the positive electrode substrate is configured such that, assuming that the positive electrode substrate is divided into five regions in a thickness direction, a region closest to a positive-electrode-substrate front surface is a front-surface-side nickel portion, a region closest to a positive-electrode-substrate back surface is a-back-surface-side nickel portion, and a middle region is a middle nickel portion, the front-surface-side nickel layer forming the nickel skeleton constituting the front-surface-side nickel portion and the back-surface-side nickel layer forming the nickel skeleton constituting the back-surface-side nickel portion are larger in thickness than the middle nickel layer forming the nickel skeleton constituting the middle nickel portion, and an average thickness B of either the front-surface-side nickel layer or the back-surface-side nickel layer, which is thicker one, and an average thickness C of the middle nickel layer satisfy a relation of C/B≧0.6.

As mentioned above, the nickel hydroxide particles each having a small diameter (e.g. a particle diameter of 5 µm or less) are likely to change to inert γ-type nickel oxyhydroxide due to repeated charge and discharge. Thus, the amount thereof should preferably be minimized. In the battery of the present invention, on the other hand, the nickel hydroxide particles with a particle diameter of 5 µm or less are contained at 15 wt % or less of the nickel hydroxide particle group filled in the pores of the positive electrode substrate. Specifically, the content of rate of nickel hydroxide particles with a particle diameter of 5 µm or less in the nickel hydroxide particle group is controlled to 15 wt % or less. This makes it possible to restrain an increase of γ-type nickel oxyhydroxide resulting from repeated charge and discharge. Thus, shortening of the battery life can be prevented.

Further, in the battery of the present invention, the positive electrode substrate is configured such that the front-surface-side nickel layer and the back-surface-side nickel layer are thicker than the middle nickel layer to satisfy the relation of C/B≧0.6 between the average thickness B of either the front-surface-side nickel layer or the back-surface-side nickel layer, which is a larger one, and the average thickness C of the middle nickel layer. In other words, the average thickness of the middle nickel layer is 60% or more of the average thickness of the front-surface-side nickel layer and the back-surface-side nickel layer. The positive electrode plate (the positive electrode substrate) can therefore have a good current collecting property in not only the portions closer to the front surface and the back surface but also in the middle portion, resulting in a reduced internal resistance. Accordingly, even when the filling amount of the nickel hydroxide particles with a small diameter (a particle diameter of 5 μm or less) is controlled to 15 wt % or less, the positive electrode plate can entirely have a good current collecting property.

With the above configuration, the battery of the present invention can provide a good current collecting property and an excellent life characteristic.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
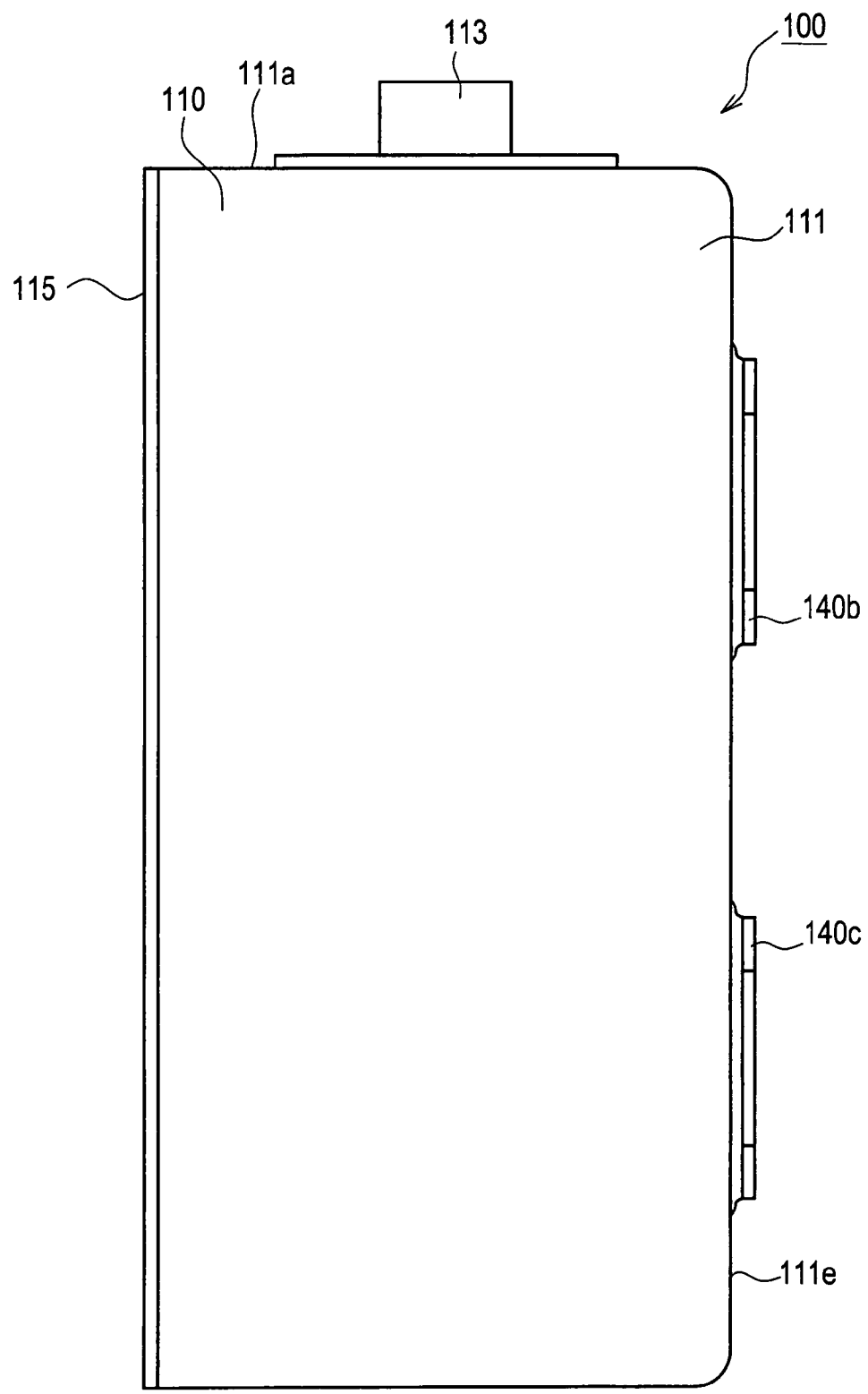
FIG. 1 is a front view of a battery in an embodiment.
Figure 2:
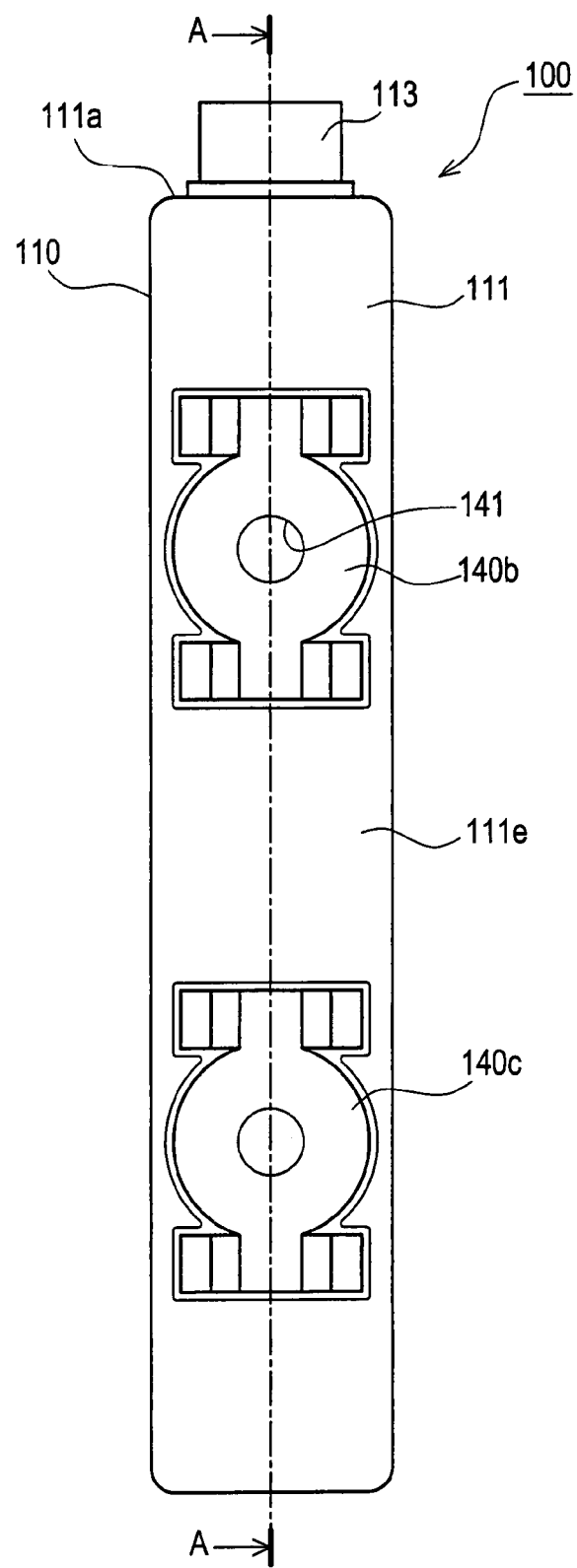
FIG. 2 is a right side view of the battery of FIG. 1.

A detailed description of a preferred embodiment of a battery 100 of the present invention will now be given referring to the accompanying drawings. FIG. 1 is a front view of the battery 100; FIG. 2 is a right side view of the same; and FIG. 3 is a sectional view of the same, taken along a line A-A in FIG. 2.

The battery 100 of the present embodiment is a rectangular sealed nickel-metal hydride storage battery comprising a battery case 110 made of metal (in particular, a nickel-plated steel plate), a safety valve 113, an electrode plate assembly 150 (see FIG. 3) and an electrolyte (not shown) contained in the battery case 110. For the electrolyte, an alkaline aqueous solution primarily consisting of KOH and having a specific gravity of 1.2 to 1.4 may be used.

Figure 3:
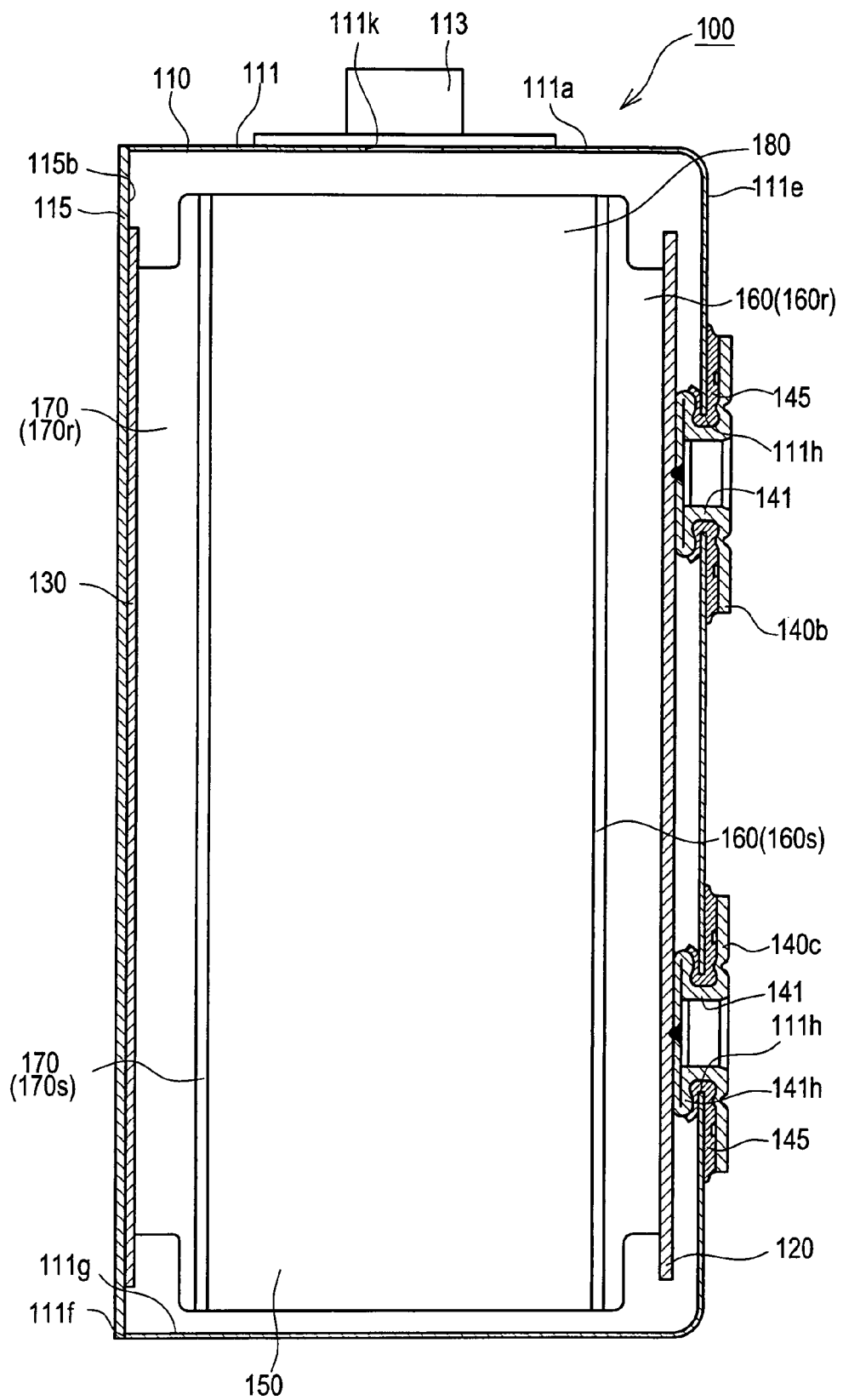
FIG. 3 is a sectional view of the battery of FIG. 1, taken along a line A-A in FIG. 2.

As shown in FIG. 3, the battery case 110 includes a rectangular box-shaped casing 111 made of metal (concretely, a nickel-plated steel plate) and a closing member 115 made of metal (concretely, a nickel-plated steel plate) in rectangular plate form. The casing 111 is formed with two through holes 111$h$ in a side wall 111$e$ (a right wall in FIG. 3). In each of the two through holes 111$h$, a first positive terminal 140$b$ or a second positive terminal 140$c$ is fitted with an electrically-insulating sealing member 145 interposed with respect to the side wall 111$e$. The closing member 115 is in contact with and welded to all around an open end 111$f$ (see FIG. 3) of the casing 111, closing an opening 111$g$ of the casing 111. The battery case 110 is thus structured of the integrally connected closing member 115 and casing 111.

Figure 4:
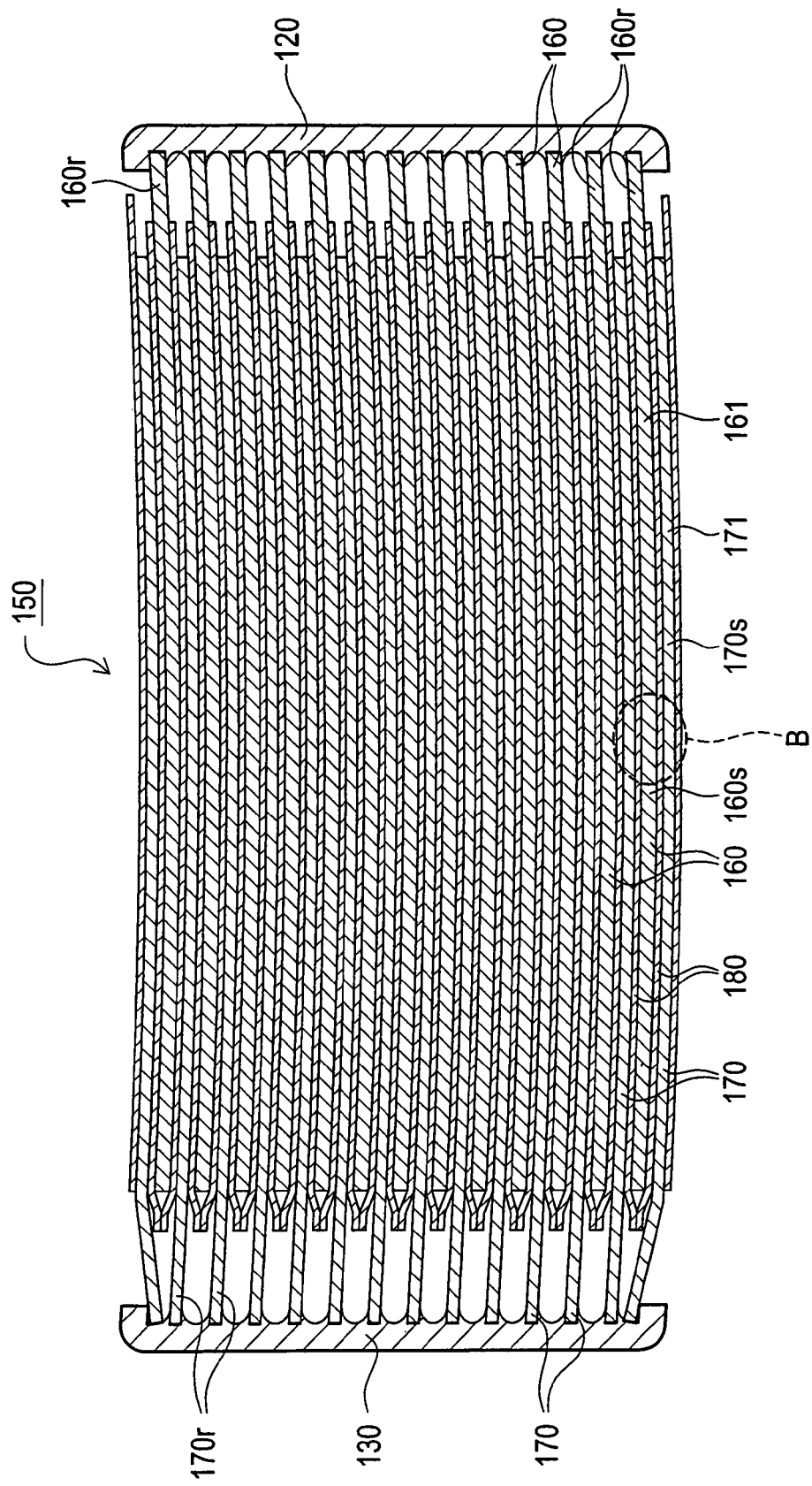
FIG. 4 is a sectional view of an electrode plate assembly of the embodiment.

The electrode plate assembly 150 comprises, as shown in FIG. 4, a plurality of positive electrode plates 160 and a plurality of negative electrode plates 170 which are alternately laminated with separators 180 interposed one by one therebetween.

Figure 5:
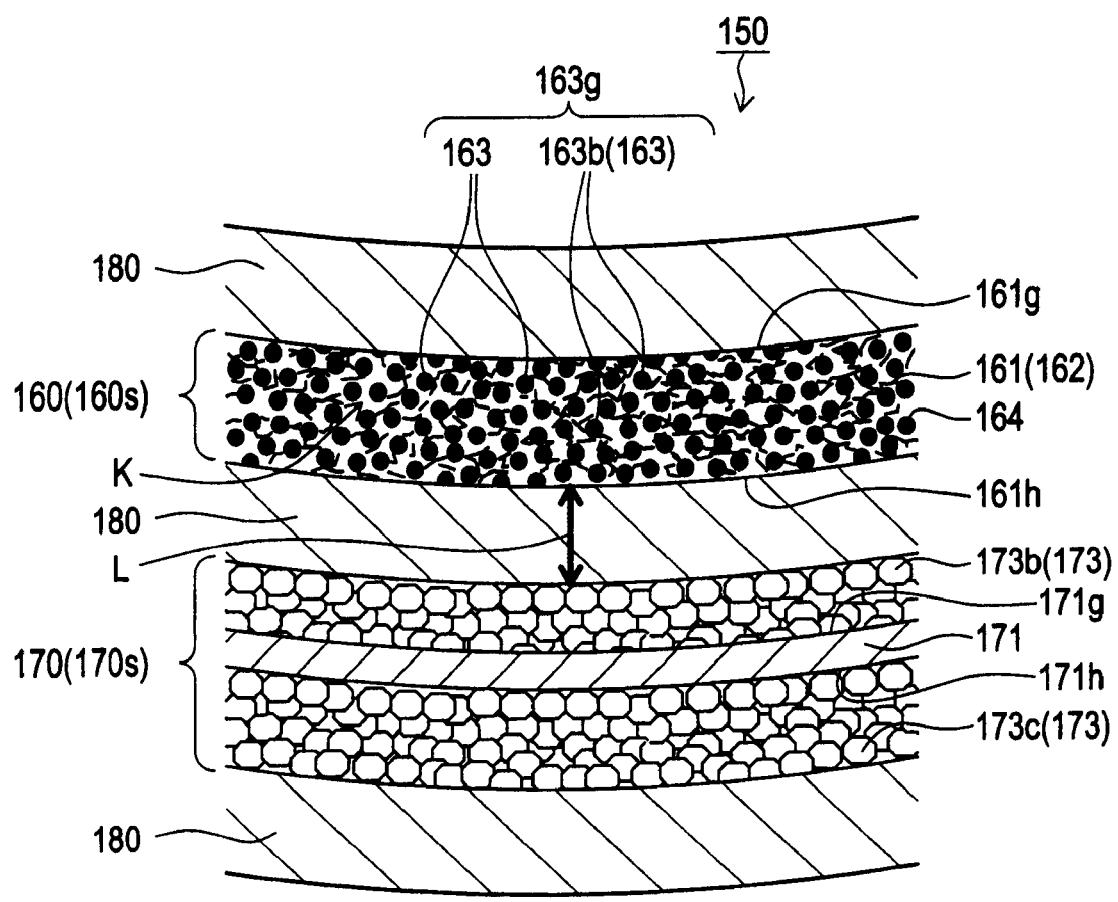
FIG. 5 is an enlarged sectional view of part of the electrode plate assembly, circled with a dotted line B in FIG. 4.

As shown in FIG. 5, each positive electrode plate 160 comprises a positive electrode substrate 161 made of nickel and including a nickel layer 162 (a nickel hollow skeleton) having a three dimensional network structure with a three-dimensional void part K formed of a number of pores coupled three-dimensionally, and a mix material for positive electrode (hereinafter, "positive mix material") 164 (nickel hydroxide particles 163 and others) filled in the void part K of the positive electrode substrate 161.

The crystals of nickel hydroxide tend to change in crystal structure and largely expand in association with charge and discharge. Accordingly, when the nickel hydroxide particles filled in the void part of the positive electrode substrate largely expand due to charge and discharge, the positive electrode substrate may be stretched, largely expanding to compress the separator significantly. This may deteriorate the insulation property between the positive and negative electrodes and decrease the amount of electrolyte contained in the separator. The battery life may be considerably shortened.

In the battery 100 in the present embodiment, on the other hand, magnesium is contained in a solid solution state in the crystals of the nickel hydroxide particles 163. Accordingly, it is possible to restrain changes in crystal structure of nickel hydroxide even when charge and discharge are repeated, thereby preventing expansion of the nickel hydroxide particles resulting from charge and discharge. Consequently, the battery 100 in the present embodiment can have an improved battery life.

Further, the nickel hydroxide particles with a small diameter (e.g. a particle diameter of 5 μm or less) are apt to change to inert γ-type nickel oxyhydroxide in association with repeated charge and discharge. Increased γ-type nickel oxyhydroxide may cause expansion of the positive electrode plate and decrease of electrolyte in the separator, which shortens a battery life. Thus, the content of the nickel hydroxide particles with a small diameter (e.g. a particle diameter of 5 μm or less) should preferably be minimized.

In the battery 100 of the present embodiment, a nickel hydroxide particle group 163g comprising a number of nickel hydroxide particles 163 filled in the void part K of the positive electrode substrate 161 contains, at a ratio of 15 wt % or less (e.g. 10 to 15 wt %), the small-diameter nickel hydroxide particles 163b each having a particle diameter of 5 μm or less. In other words, the content of the small-diameter nickel hydroxide particles 163b each having a particle diameter of 5 μm or less in the nickel hydroxide particle group 163g is controlled to 15 wt % or less. This "content" is also hereinafter referred to as the "content rate" of the small-diameter nickel hydroxide particles 163b. In the battery 100 of the present embodiment can restrain an increase of γ-type nickel oxyhydroxide resulting from repeated charge and discharge. This makes it possible to prevent shortening of the battery life.

Figure 9:
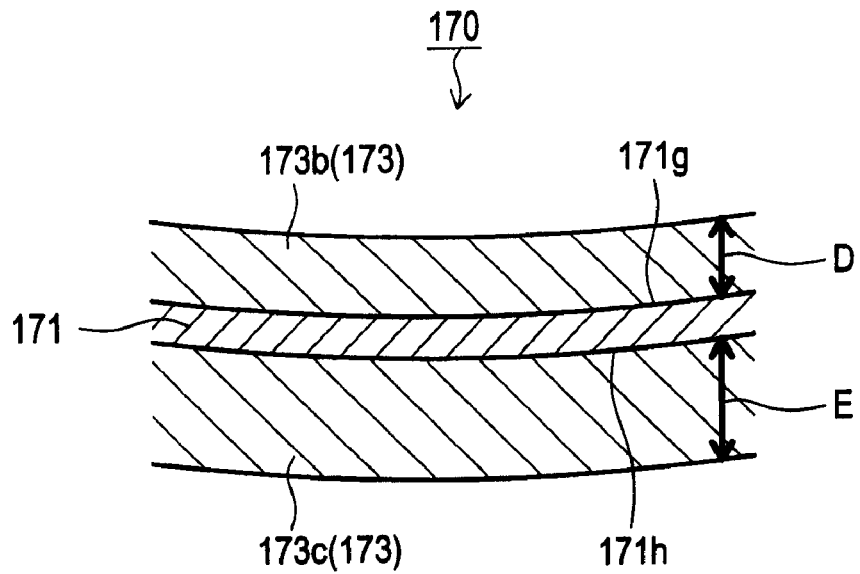
FIG. 9 is an enlarged sectional view of part of a negative electrode plate of the embodiment.

Each negative electrode plate 170 comprises a perforated negative electrode substrate 171 made of a nickel-plated steel plate with a number of through holes (not shown) and a front-surface-side negative mix material layer 173b formed on a front surface 171g of the negative electrode substrate 171 and a back-surface-side negative mix material layer 173c formed on a back surface 171h, both layers 173b and 173c being made of a mix material for negative electrode (hereinafter, "negative mix material") 173 (containing a hydrogen absorbing alloy), as shown in FIG. 5. Of them, the front-surface-side negative mix material layer 173b and the back-surface-side negative mix material layer 173c are different in thickness. To be specific, as shown in FIG. 9, the thickness D of the front-surface-side negative mix material layer 173b and the thickness E of the back-surface-side negative mix material layer 173c are determined to satisfy a relation of D<E.

Each separator 180 may be a nonwoven fabric made of synthetic fibers having been subjected to a hydrophilic treatment.

Each of the positive electrode plates 160 includes a positive-electrode filled portion 160s (see FIG. 5) in which the positive electrode substrate 161 is filled with the positive mix material 164 and a positive-electrode connecting end portion 160r in which the positive electrode substrate 161 is filled with no positive mix material, as shown in FIG. 4. Those positive electrode plates 160 are arranged with respective positive electrode connecting end portions 160r protruding in a predetermined direction (rightward in FIG. 4).

The positive electrode connecting end portions 160r are connected to a rectangular positive current collector 120 by electron beam welding or the like as shown in FIG. 4. The positive current collector 120 is further connected to the first and second positive terminals 140b and 140c by laser welding or the like as shown in FIG. 3. In this way, the positive electrode plates 160 are electrically connected to the first and second positive terminals 140b and 140c.

Each of the negative electrode plates 170 includes a negative electrode coated portion 170s in which the negative electrode substrate 171 is coated with the negative mix material 173 and a negative electrode connecting end portion 170r in which the negative electrode substrate 171 is coated with no negative mix material. Those negative electrode plates 170 are arranged with respective negative electrode connecting end portions 170r protruding in an opposite direction (leftward in FIG. 4) to the positive electrode connecting end portions 160r.

The negative electrode connecting end portions 170r are connected to a rectangular negative current collector 130 by electron beam welding or the like. The negative current collector 130 is further connected to the closing member 115 by electron beam welding or the like as shown in FIG. 3. In the battery 100 of the present embodiment, accordingly, the battery case 110 including the closing member 115 entirely serves as a negative electrode.

Figure 6:
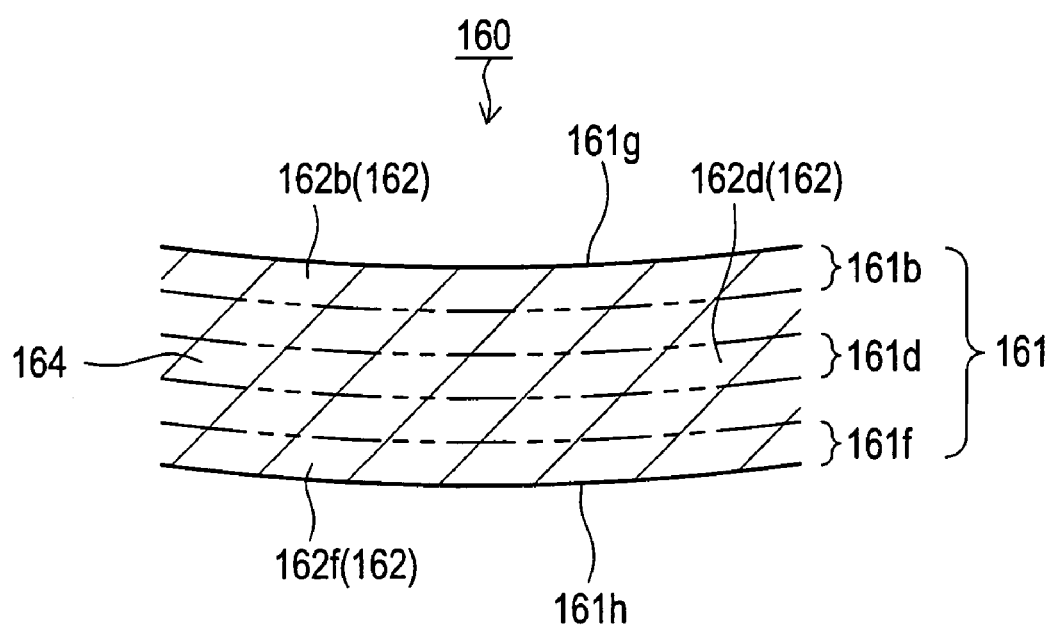
FIG. 6 is an enlarged sectional view of part of a positive electrode plate of the embodiment.

As indicated with chain double-dashed lines in FIG. 6, it is assumed that the positive electrode substrate 161 is divided into five regions in its thickness direction (in a vertical direction in FIG. 6), where a region closest to the front surface 161g is a front-surface-side nickel portion 161b, a region closest to the back surface 161h is a back-surface-side nickel portion 161f, and a middle region is a middle nickel portion 161d. Here, an average thickness of the front-surface-side nickel layer 162b forming the nickel skeleton 162 constituting the front-surface-side nickel portion 161b and an average thickness of a back-surface-side nickel layer 162f forming the nickel skeleton 162 constituting a back-surface-side nickel portion 161f are determined to be larger than an average thickness of the middle nickel layer 162d forming the nickel skeleton constituting the middle nickel portion 161d.

Comparing the average thickness between the front-surface-side nickel layer 162b and the back-surface-side nickel layer 162f, the average thickness of the back-surface-side nickel layer 162f is larger. In addition, the average thickness B of the back-surface-side nickel layer 162f and the average thickness C of the middle nickel layer 162d are determined to satisfy a relation of C/B≧0.6. Specifically, the average thickness C of the middle nickel layer 162d is as large as 60% or more of the average thicknesses of the front-surface-side nickel layer 162b and back-surface-side nickel layer 162f.

Accordingly, the positive electrode plate 160 (the positive electrode substrate 161) can have a good current collecting property in not only the portions close to the front surface 161g and the back surface 161h but also in the middle nickel portion 161d, resulting in a reduced internal resistance. Even when the filling amount of the small-diameter nickel hydroxide particles 163b with a small diameter (a particle diameter of 5 μm or less) is controlled to 15 wt % or less, the positive electrode substrate can have a good current collecting property. As described above, therefore, even where the content rate of the small-diameter nickel hydroxide particles 163b each having a particle diameter of 5 μm or less is controlled to 15 wt % or less, the positive electrode plate 160 can have a good current collecting property.

It is to be noted that the average thickness C of the middle nickel layer 162d and the average thickness B of the back-surface-side nickel layer 162f are preferably measured in the following manner. Here, the average thickness of the front-surface-side nickel layer 162b can be measured as in the same manner for the back-surface-side nickel layer 162f and therefore its explanation is omitted.

Figure 7:
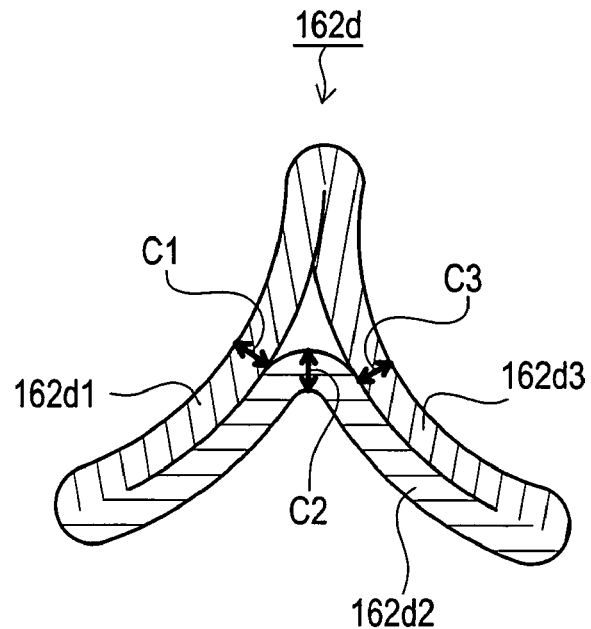
FIG. 7 is an enlarged sectional view of part of a middle nickel layer of the positive electrode substrate in the embodiment.

The section of the positive electrode substrate 161 is first observed through an SEM (scanning electron microscope) by selecting a sectional image of part of the middle nickel layer 162d of the middle nickel portion 161d cut in the thickness direction of that nickel layer 162d to include a triangular section with three sides inwardly curved as shown in FIG. 7.

Respective central thicknesses C1, C2, and C3 of three sides 162d1, 162d2, and 162d3 constructed of the middle nickel layer 162d are measured and an average value of them is assumed to be the average thickness C of the middle nickel layer 162d.

Figure 8:
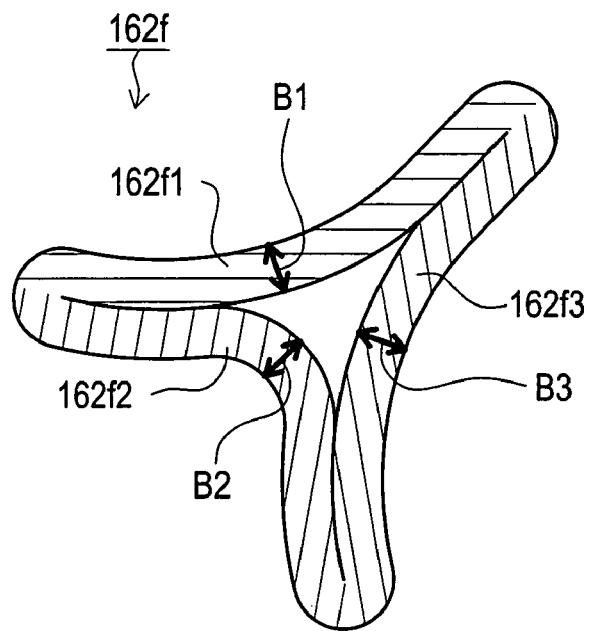
FIG. 8 is an enlarged sectional view of part of a back-surface-side nickel layer of the positive electrode substrate in the embodiment.

Similarly, the section of the back-surface-side nickel portion 161f is observed through the SEM by selecting a sectional image of part of the back-surface-side nickel layer 162f cut in the thickness direction of that nickel layer 162f to include a triangular section with three sides inwardly curved as shown in FIG. 8. Respective central thicknesses B1, B2, and B3 of three sides 162f1, 162f2, and 162f3 constructed of the back-surface-side nickel layer 162f are measured and an average value of them is assumed to be the average thickness B of the back-surface-side nickel layer 162f.

The negative electrode plate 170 is configured as shown in FIG. 9 such that the front-surface-side negative mix material layer 173b formed on the front surface 171g of the negative electrode substrate 171 and the back-surface-side negative mix material layer 173c formed on the back surface 171h are different in thickness. Specifically, the thickness D of the front-surface-side negative mix material layer 173b and the thickness E of the back-surface-side negative mix material layer 173c are determined to satisfy a relation of D<E.

A method of manufacturing the battery 100 of the present embodiment will be described below.

Firstly, the method of manufacturing the positive electrode substrate 160 is explained.

[Plating Step]

Figure 10:
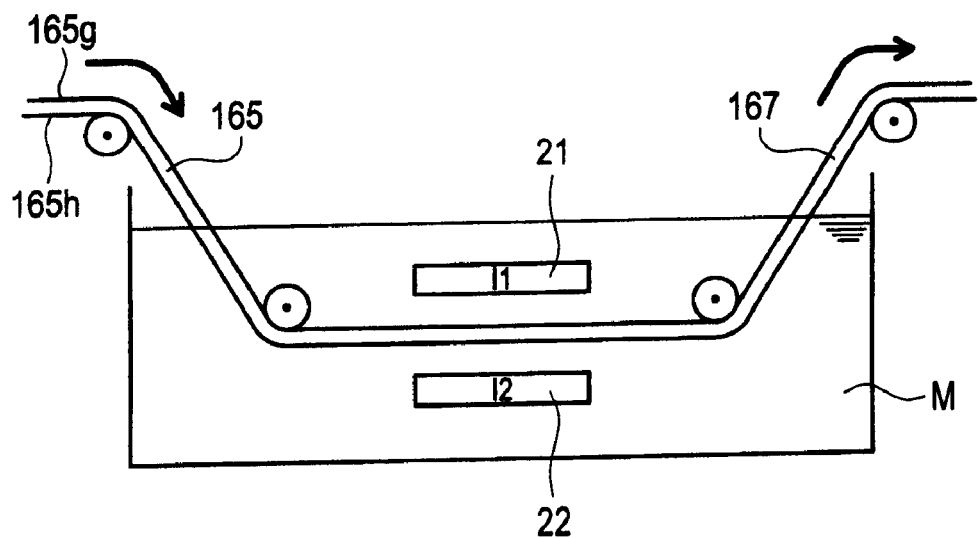
FIG. 10 is an explanatory view for describing a method of manufacturing the positive electrode substrate of the embodiment.

As shown in FIG. 10, a band-shaped foamed urethane substrate 165 having been coated with electroless nickel plating is fed in a direction indicated by an arrow at a predetermined speed and immersed in a electroless nickel plating solution M for a predetermined time. During this immersion, a predetermined amount of current is supplied to a first electrode 21 placed facing a front surface 165g of the foamed urethane substrate 165 and a second electrode 22 placed facing a back surface 165h of the foamed urethane substrate 165. Consequently, produced is a nickel-coated urethane substrate 167 in which a urethane skeleton surface of the foamed urethane substrate 165 is coated with nickel plating (nickel layer 162) (see FIG. 11).

Figure 11:
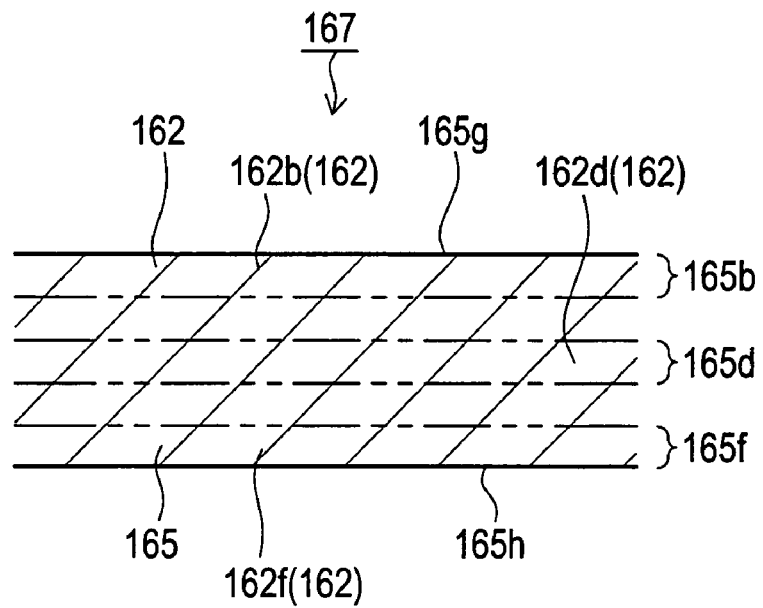
FIG. 11 is an enlarged sectional view of part of a nickel-coated urethane substrate of the embodiment.

Specifically, the resultant nickel-coated urethane substrate 167 is of a configuration that the front-surface-side nickel layer 162b coating the urethane skeleton constituting a front-surface-side urethane portion 165b and the back-surface-side nickel layer 162f coating the urethane skeleton constituting the back-surface-side urethane portion 165f are larger in thickness than the middle nickel layer 162d coating the urethane skeleton constituting the middle urethane portion 165d. Here, as shown in FIG. 11, assuming that the foamed urethane substrate 165 is divided into five regions in a direction of thickness, a region closest to the front surface 165g is the front-surface-side urethane portion 165ba, a middle region is the middle urethane portion 165d, and a region closest to the back surface 165h is the back-surface-side urethane portion 165f.

In the present embodiment, particularly, a current value I1 of the first electrode 21 placed facing a front surface 165g of the foamed urethane substrate 165 and a current value I2 of the second electrode 22 placed facing a back surface 165h of the foamed urethane substrate 165 are determined to be different from each other. Specifically, the current value I2 of the second electrode 22 is set to be larger than the current value I1 of the first electrode 21. Accordingly, the average thickness of the back-surface-side nickel layer 162f can be made larger than the average thickness of the front-surface-side nickel layer 162b.

In the present embodiment, particularly, the feed speed for the foamed urethane substrate 165 is set to be slow to immerse the foamed urethane substrate 165 in the electroless nickel plating solution M for a long time. Thus, the nickel plating can be applied to satisfy the relation of C/B≧0.6 between the average thickness B of the back-surface-side nickel layer 162f which is larger than that of the front-surface-side nickel layer 162b and the average thickness C of the middle nickel layer 162d.

The current value for the electrolytic nickel plating and the immersion time into the electrolytic nickel plating solution may be controlled to bring the value of C/B to a value extremely closer to "1". However, the plating step under this condition takes a long time, leading to deterioration in productivity. In light of production efficiency and others, it is preferable to determine the condition to satisfy a relation of 0.6≦C/B≦0.9.

Figure 12:
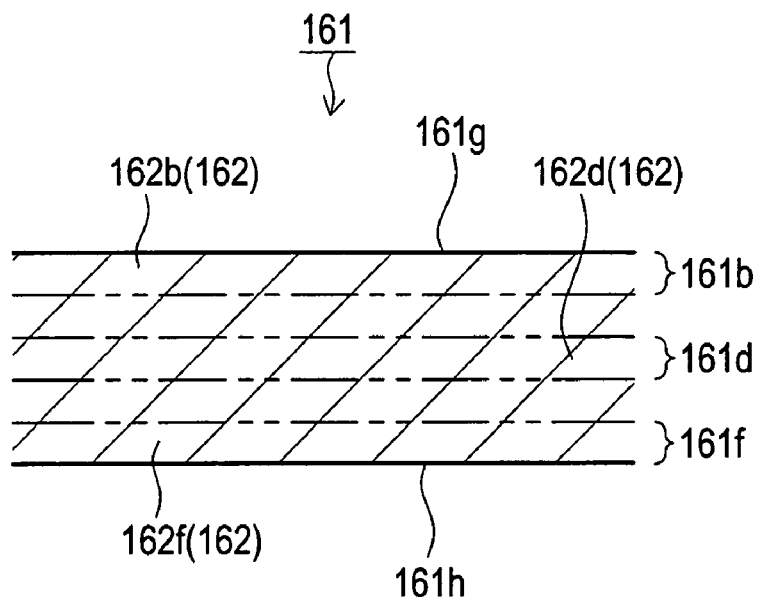
FIG. 12 is an enlarged sectional view of part of the positive electrode substrate of the embodiment.
Figure 13:
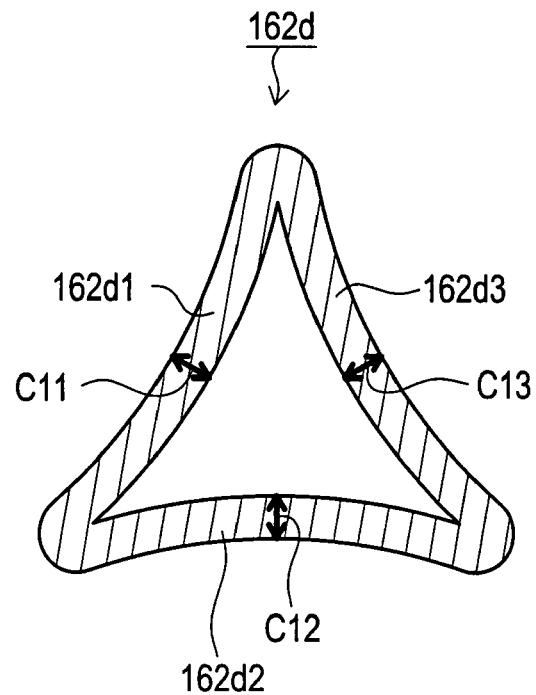
FIG. 13 is an enlarged sectional view of part of the front-surface-side nickel layer of the positive electrode substrate (before compression) of the embodiment.

Thereafter, the urethane forming the nickel-coated urethane substrate 167 is burned off. The positive electrode substrate 161 shown in FIG. 12 is thus produced. As indicated with chain double-dashed lines in FIG. 12, it is assumed that the positive electrode substrate 161 is divided into five regions in its thickness direction (in a vertical direction in FIG. 12), in which a region closest to the front surface 161g is the front-surface-side nickel portion 161b, a region closest to the back surface 161h is the back-surface-side nickel portion 161f, and a middle region is the middle nickel portion 161d.

As to the positive electrode substrate 161 produced as above, the average thickness C of the middle nickel layer 162d and the average thickness B of the back-surface-side nickel layer 162f are measured in the following manner. It is to be noted that the average thickness of the front-surface-side nickel layer 162b can be measured in the same manner as for the back-surface-side nickel layer 162f and therefore its explanation is omitted herein.

Firstly, the void part (pores) K (see FIG. 5) of the positive electrode substrate 161 is filled with resin and then cut in the thickness direction. The reason for filling the resin in the void part K is to prevent the nickel layer 162 from becoming compressed and deformed when the positive electrode substrate 161 is cut in the thickness direction.

Secondly, after polishing the cut surface, the section of the positive electrode substrate 161 is observed through the SEM (scanning electron microscope) by selecting a sectional image of the middle layer 162d of the middle nickel portion 161d cut in the thickness direction thereof, taking a triangular form having three sides. Respective central thicknesses C11, C12, and C13 of the three sides 162d1, 162d2, and 162d3 constructed of the middle nickel layer 162d are measured. An average value of them is assumed to be the average thickness C of the middle nickel layer 162d.

Figure 14:
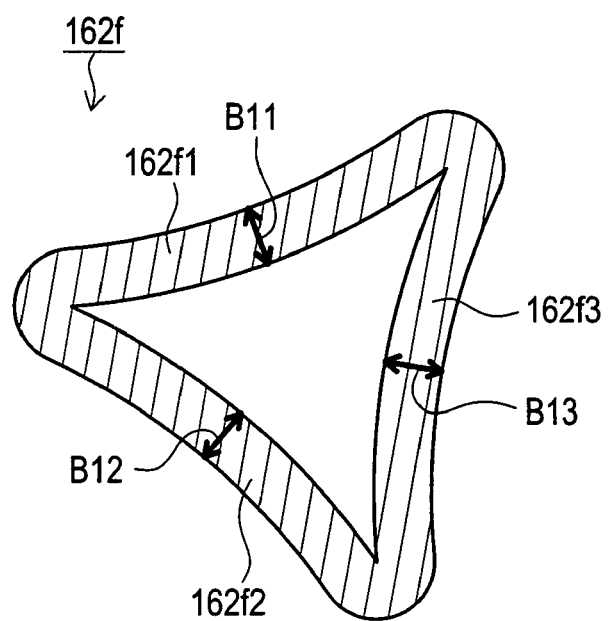
FIG. 14 is an enlarged sectional view of part of the back-surface-side nickel layer of the positive electrode substrate (before compression) of the embodiment.

Similarly, the section of the back-surface-side nickel portion 161f of the back-surface-side nickel portion 161f is observed through the SEM by selecting a sectional image of the back-surface-side nickel layer 162f cut in the thickness direction thereof, taking a triangular form as shown in FIG. 14. Respective central thicknesses B11, B12, and B13 of three sides 162f1, 162f2, and 162f3 constructed of the back-surface-side nickel layer 162f are measured. An average value of them is assumed to be the average thickness B of the back-surface-side nickel layer 162f.

Further, the average thickness of the front-surface-side nickel layer 162b is measured in the same manner as above.

As to this positive electrode substrate 161, as a result of comparison between the average thickness of the front-surface-side nickel layer 162b and the average thickness B of the back-surface-side nickel layer 162f, the average thickness B of the back-surface-side nickel layer 162f was larger. Further, as a result of comparison between the average thickness B of the back-surface-side nickel layer 162f and the average thickness C of the middle nickel layer 162d, it was found that the relation of C/B≧0.6 was established.

Subsequently, the positive electrode plate 160 is produced using the aforementioned positive electrode substrate 161.

Firstly, nickel hydroxide particles is produced as follows. A solution mixture containing nickel sulfate and magnesium sulfate, an aqueous sodium hydroxide solution, and an aqueous ammonia solution are prepared and continuously supplied at a constant flow rate into a reactor held at 50° C. The solution mixture containing nickel sulfate and magnesium sulfate is prepared with the mixture ratio between nickel sulfate and magnesium sulfate that is adjusted such that the ratio of the number of moles of magnesium to the total number of moles of nickel and magnesium is 5 mol %.

Then, after the pH in a reaction vessel becomes constant at 12.5 and the balance between the respective concentrations of a metallic salt and metal hydroxide particles become constant so that a steady state is reached, a suspension that has overflown from the reaction vessel is collected and a precipitate is separated by decantation. Thereafter, the precipitate is washed with water and dried so that nickel hydroxide powder is obtained.

As a result of composition analysis with respect to the resultant nickel hydroxide powder by using ICP emission analysis, the proportion of magnesium to all the metal elements (nickel and magnesium) contained in each of the nickel hydroxide particles was 5 mol % in the same manner as in the solution mixture used for synthesis. As a result of recording an X-ray diffraction pattern using a CuKα beam, it was proved that each of the particles was composed of a β-Ni(OH)$_2$-type. No peak representing the existence of impurities was found. This revealed that magnesium was solid-solved in the crystals of nickel hydroxide.

As a result of measuring a particle size distribution of the resultant nickel hydroxide particles using a scattering particle size distribution analyzer (LA910, made by HORIBA, Ltd.), it was found that an average particle size was about 10 μm. Further, as a result of finding the content rate of the small-diameter nickel hydroxide particles 163b each having a particle diameter of 5 μm or less in the resultant nickel hydroxide powder, it was 15 wt % or less (e.g. 10 to 15 wt %).

The content rate of the small-diameter nickel hydroxide particles 163b each having a particle diameter of 5 μm or less can be adjusted to a predetermined value by control of a residence time of nickel hydroxide particles crystallized in the reaction vessel. Specifically, for instance, the residence time of the nickel hydroxide particles in the reaction vessel should preferably be made longer to cause the crystal growth of nickel hydroxide particles at a lower rate, thereby reducing the content rate of the small-diameter nickel hydroxide particles 163b. Accordingly, it is possible to control the content rate of the small-diameter nickel hydroxide particles 163b having a particle diameter of 5 μm or less to 15 wt % or less.

Subsequently, the nickel hydroxide powder obtained as above is mixed with metal cobalt powder and water is added thereto. The resultant mixture is kneaded into a paste for positive electrode (hereinafter, a "positive paste"). It is to be noted that the metal cobalt powder is added at a ratio of 8 parts by weight to 100 parts by weight of the nickel hydroxide powder.

This positive paste is filled in the void part K of the positive electrode substrate 161, dried, pressure-molded, and cut into a specified size, whereby the positive electrode plate is produced.

In the present embodiment, meanwhile, prior to filling the positive paste in the void part K of the positive electrode substrate 161, this substrate 161 is compressed into a predetermined thickness in order to adjust the filling amount of the positive paste. Accordingly, if the thickness of the middle nickel layer 162d is extremely thinner than the front-surface-side nickel layer 162b and the back-surface-side nickel layer 162f, the middle nickel portion 161d is likely to be crushed by compression made before the positive paste is filled therein, with the result that the void part K in that portion disappears. In this case, the positive paste cannot be sufficiently filled in the middle nickel portion 161d. This may deteriorate a current collecting property of the positive electrode plate and a life characteristic.

In the present embodiment, on the other hand, as mentioned above, used is the positive electrode substrate 161 in which the average thickness B of the back-surface-side nickel layer 162f is larger than the average thickness of the front-surface-side nickel layer 162b and also the average thickness B of the back-surface-side nickel layer 162f and the average thickness C of the middle nickel layer 162d satisfy the relation of C/B≧0.6. In other words, used is the positive electrode substrate 161 in which the average thickness C of the middle nickel layer 162d is determined to be as large as 60% or more of the average thickness B of the front-surface-side nickel layer 162b and back-surface-side nickel layer 162f. This makes it possible to prevent the middle nickel portion 161d from being crushed by compression performed before the positive paste is filled, thus allowing the positive paste to be filled sufficiently in the middle nickel portion 161d. Consequently, the current collecting property of the positive electrode plate and the battery life characteristic can be improved.

Next, the negative electrode plate 170 is produced. Firstly, the negative electrode substrate 171 made of a band-shaped nickel-plated steel plate formed with a number of perforated through holes is prepared. Separately from this, hydrogen absorbing allow MmNi$_{3.55}$Co$_{0.75}$Al$_{0.3}$Mn$_{0.4}$ powder is mixed with water and carboxymethyl cellulose (a binder). This resultant mixture is kneaded into a paste for negative electrode (hereinafter, a "negative paste") 176.

Figure 15:
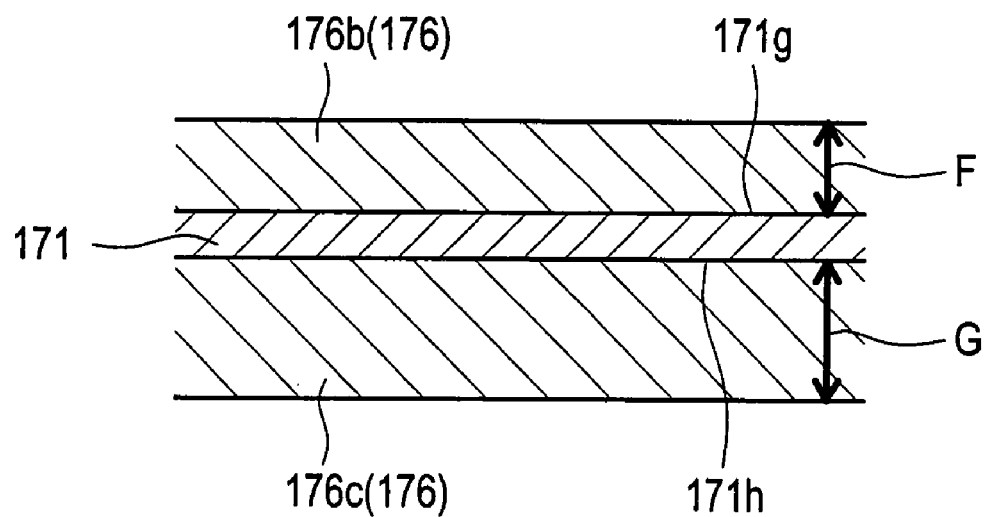
FIG. 15 is an explanatory view for describing a method of manufacturing the negative electrode plate of the embodiment.

As shown in FIG. 15, successively, the negative paste 176 is filled in the through holes of the negative electrode substrate 171 and simultaneously coated on the front surface 171g and the back surface 171h of the negative electrode substrate 171, forming a front-surface-side negative paste layer 176b and a back-surface-side negative paste layer 176c. To be more precise, the negative paste 176 is applied to establish a relation of F<G between a thickness F of the front-surface-side negative paste layer 176b and a thickness G of the back-surface-side negative paste layer 176c.

Then, the negative paste 176 is dried and hardened (the negative paste 176 when dried and hardened comes to a negative mix material 173), producing the negative electrode substrate 171 provided with the negative mix material layer 173. This negative electrode substrate 171 is pressure-molded and cut into a specified size. The negative electrode plate 170 can be produced with the relation of D<E between the thickness D of the front-surface-side negative mix material layer 173b and the thickness E of the back-surface-side negative mix material layer 173c as shown in FIG. 9.

Successively, the positive electrode plates 160 and the negative electrode plates 170 produced as above are alternately laminated with the separators 180 interposed one by one between them, constituting the electrode plate assembly 150. To be specific, as shown in FIG. 5, the positive electrode plates 160 and the negative electrode plates 170 are alternately laminated with the separators 180 interposed one by one so that the front surfaces 161g of the positive electrode substrates 161 and the front surfaces 171g of the negative electrode substrates 171 face to the same side (the upper side in FIG. 5) in the lamination direction (the vertical direction in FIG. 5). In this manner, the electrode plate assembly 150 shown in FIG. 5 is produced.

As shown in FIG. 4, the positive current collector 120 is connected by electron beam welding to the positive electrode connecting end portions 160r of the positive electrode plates 160 of the electrode plate assembly 150. Further, the negative current collector 130 is connected by electron beam welding to the negative electrode connecting end portions 170r of the negative electrode plates 170.

Separately from this, as shown in FIG. 3, the first and second positive terminals 140b and 140c are fixed to the casing 111. Specifically, the sealing members 145 are fitted in the through holes 111h of the casing 111 and then the cylindrical parts 141 of the first and second positive terminals 140b and 140c are respectively inserted therein from outside. Under fluid pressure to the recess of each cylindrical part 141, a closed end of the cylindrical part 141 is axially compressed to radially outwardly expand, forming the compressively-deformed portion 141h. Accordingly, the first and second positive terminals 140b and 140c are fixed to the casing 111 but electrically insulated therefrom.

Thereafter, the negative current collector 130 connected to the negative electrode plates 170 of the electrode plate assembly 150 is connected to an inner surface 115b of the closing member 115 by electron beam welding. This connected assembly is inserted, from the positive current collector 120 side, into the casing 111 through the opening 111g. At this time, the closing member 115 can close the casing 111. By laser irradiation from outside, the closing member 115 and the casing 111 are connected to each other, thus closing the casing 111. The first and second positive terminals 140b and 140c are then subjected to laser irradiation from outside to respective recesses of the cylindrical parts 141. The compressively-deformed portion 141h of each cylindrical part 141 is connected to the positive current collector 120. An electrolyte is poured in the casing 111 through a port 111k formed on a top wall 111a and then the safety valve 113 is attached to close the port 111k. After subjected to a predetermined step such as initial charge, the battery 100 is completed.

[Evaluation of Battery Characteristics]

Next, characteristic evaluation was performed with respect to each of the batteries 100 according to the present embodiment (Examples 1 to 6) and the batteries according to comparative configurations (Comparative examples 1 to 4).

Specifically, ten types of batteries (Examples 1 to 6 and Comparative examples 1 to 4) were prepared under the condition that they were different in combination of the C/B value of the positive electrode plate and the content rate of the small-diameter nickel hydroxide particles 163b each having a particle diameter of 5 μm or less, but equal in other conditions. It is to be noted that the C/B value can be changed according to the adjustment of the immerse time of the foamed urethane substrate 165 in the electrolytic nickel plating solution M. Further, the content rate of the small-diameter nickel hydroxide particles 163b can be changed according to the control of the residence time of the nickel hydroxide particles crystallized in the reaction vessel.

EXAMPLES 1 TO 6

As shown in Table 1, the battery samples according to Examples 1 to 4 were produced under the condition that the content rates of the small-diameter nickel hydroxide particles 163b were equally 10 wt %, while the C/B value was different by sample; 0.6, 0.65, 0.7, and 0.75. The battery samples according to Examples 5 and 6 were produced under the condition that the C/B value was equally 0.7, while the content rate of the small-diameter nickel hydroxide particles 163b was different by sample; 13 wt % and 15 wt %.

In Table 1, the content rate of the small-diameter nickel hydroxide particles 163b is represented simply in "Content Rate".

TABLE 1

|  | C/B | Content Rate (wt %) | Battery internal resistance | (N/M) × 100 |
| --- | --- | --- | --- | --- |
| Example 1 | 0.6 | 10 | 101 | 89 |
| Example 2 | 0.65 | 10 | 100 | 90 |
| Example 3 | 0.7 | 10 | 100 | 90 |
| Example 4 | 0.75 | 10 | 98 | 91 |
| Example 5 | 0.7 | 13 | 100 | 88 |
| Example 6 | 0.7 | 15 | 100 | 85 |
| Comparative Example 1 | 0.5 | 10 | 105 | 87 |
| Comparative Example 2 | 0.55 | 10 | 104 | 88 |
| Comparative Example 3 | 0.7 | 17 | 99 | 78 |
| Comparative Example 4 | 0.7 | 20 | 99 | 62 |

COMPARATIVE EXAMPLES 1 TO 4

As shown in Table 1, the battery samples according to Comparative examples 1 and 2 were produced under the condition that the content rate of the small-diameter nickel hydroxide particles 163b was equally 10 wt %, while the C/B value was different by sample; 0.5 and 0.55. Further, the battery samples according to Comparative examples 3 and 4 were produced under the condition that the C/B value was equally 0.7, while the content rate of the small-diameter nickel hydroxide particles 163b was different by sample; 17 wt % and 20 wt %.

The characteristic evaluation was performed with respect to each of the sample batteries according to Examples 1 to 6 and Comparative examples 1 to 4.

Specifically, each sample battery was subjected to ten charge-discharge cycles each including charging with a current of 1C for 1.2 hours and then discharging to a battery voltage of 0.8V with a current of 1C. Successively, each sample was subjected to charging with a current of 0.1C for 12 hours and discharging to a battery voltage of 0.8V with a current of 0.2C. The discharge capacity at the time was assumed to be M(Ah).

Thereafter, each sample was subjected to one hundred charge-discharge cycles each including charging with a current of 1C for 1.2 hours and discharging to 0.8V with a current of 1C. Successively, each sample was subjected to charging with a current of 0.1C for 12 hours and discharging to a battery voltage of 0.8V with a current of 0.2C. The discharge capacity at the time was assumed to be N(Ah). Further, an index representing the battery life characteristics were calculated by "N/M×100". These results are shown in Table 1.

The results were first compared between the battery samples according to Examples 3, 5, and 6 and the battery samples according to Comparative examples 3 and 4. These battery samples had a relation that the C/B value was equally 0.7 while the content rate of the small-diameter nickel hydroxide particles 163*b* each having a particle diameter of 5 µm or less was different by sample. As shown in Table 1, in Comparative example 3 in which the content rate of the small-diameter nickel hydroxide particles 163*b* was 17 wt %, the value of N/M×100 was 78, representing inferior life characteristics. In Comparative example 4 with an increased content rate of the small-diameter nickel hydroxide particles 163*b* (i.e. up to 20 wt %), the value of N/M×100 was 62, showing a large decrease in life characteristics.

On the other hand, in Example 6 in which the content rate of the small-diameter nickel hydroxide particles 163*b* was reduced to 15 wt %, the value of N/M×100 was 85, representing good life characteristics. Further, in Example 5 in which the content rate of the small-diameter nickel hydroxide particles 163*b* was reduced to 13 wt %, the value of N/M×100 was 88, representing good life characteristics. In Example 3 in which the content rate of the small-diameter nickel hydroxide particles 163*b* was reduced to 10 wt %, the value of N/M×100 was 90, representing superior life characteristics. From these results, restraining the content rate of the small-diameter nickel hydroxide particles 163*b* each having a particle diameter of 5 µm or less to 15 wt % or less can provide good life characteristics. This is conceivably because restraining the content rate of the small-diameter nickel hydroxide particles 163*b* each having a particle diameter of 5 µm or less to 15 wt % or less can prevent an increase of the γ-type nickel oxyhydroxide resulting from repeated charge and discharge.

The results of battery samples according to Examples 1 to 4 and the battery samples of Comparative examples 1 and 2 were further compared as follows. These battery samples had a relation that the content rate of the small-diameter nickel hydroxide particles 163*b* each having a particle diameter of 5 µm or less was equally 10 wt % while the C/B value was different by sample. As shown in Table 1, in Comparative examples 1 and 2 in which the C/B value was 0.5 and 0.55, the value of N/M×100 was 87 and 88. In Examples 1 to 4 in which the C/B value was 0.6 or more, the value of N/M×100 was 89 or more. It is clear from these results that the C/B value should be set to 0.6 or more when the content rate of the small-diameter nickel hydroxide particles 163*b* with a particle diameter of 5 µm or less is set to a predetermined value equal to or smaller than 15 wt %, thereby providing more excellent life characteristics.

Each of the battery samples according to Examples 1 to 6 and Comparative examples 1 to 4 was subjected to a measurement on battery internal resistance. Evaluations of a current collecting property were made based on the measurement values of respective battery internal resistances.

Specifically, each sample battery was subjected to ten charge-discharge cycles each including charging with a current of 1C for 1.2 hours and then discharging to a voltage of 0.8V with a current of 1C. Successively, each sample was subjected to charge and discharge for 5 seconds respectively with each of currents of 0.5C, 1C, 2C, and 3C. For each current value, a battery voltage after 5-second charge and a battery voltage after 5-second discharge were measured. Thereafter, the battery internal resistance was obtained based on each measurement value. To be more precise, each measurement value was plotted in a current-voltage diagram and the plotted points were connected into a straight line, so that the battery internal resistance was found from inclination of the straight line.

Those results are shown in Table 1, which describes the battery internal resistance value of each battery sample in the form of a relative value to the battery internal resistance of the battery sample according to Example 3, referring to the battery internal resistance value of the battery sample according to Example 3 as a reference (100).

Comparison was first made on the results of the battery samples according to Examples 1 to 4 and the battery samples according to Comparative Examples examples 1 and 2. These battery samples had a relation that the content rate of the small-diameter nickel hydroxide particles 163*b* each having a particle diameter of 5 µm or less was equally 10 wt % while the C/B value was different by sample. As shown in Table 1, in Comparative Examples 1 and 2 in which C/B=0.5 and 0.55 respectively, the relative value of the battery internal resistance was 105 and 104. In Example 1 in which C/B=0.6, on the other hand, the battery internal resistance value was 101, representing that the internal resistance could be reduced largely as compared with Comparative examples 1 and 2. In Examples 2 to 4 in which C/B=0.65, 0.7, and 0.75 respectively, the battery internal resistance value was 100, 100, and 98 respectively, revealing that the internal resistance could be further reduced. From these results, it is proved that the relation of C/B≧0.6 can provide a good current collecting property.

Comparison was further made on the battery samples according to Examples 3, 5, and 6 and the battery samples according to Comparative Examples 3 and 4. These battery samples had a relation that the CB value was equally 0.7 while the content rate of the small-diameter nickel hydroxide particles 163*b* each having a particle diameter of 5 µm or less was different by sample. As shown in Table 1, in Examples 5 and 6 in which the content rate of the small-diameter nickel hydroxide particles 163*b* was increased (i.e. 13 wt % and 15 wt %) than in Example 3, the relative value of the battery internal resistance was equally 100, showing the equivalent internal resistance to that in Example 3. Further, in Comparative Examples 3 and 4 in which the content rate of the small-diameter nickel hydroxide particles 163*b* was increased (i.e. 17 wt % and 20 wt %), the relative value of the battery internal resistance was equally 99, showing the equivalent internal resistance to that in Example 3.

It is clear from those results that the relation of C/B≧0.6 can provide an equivalent good current collecting property even if the content rate of the small-diameter nickel hydroxide particles 163*b* is changed in a range of 10 wt % to 20 wt %. Consequently, the relation of C/B≧0.6 can provide a good current collecting property even when the content rate of the small-diameter nickel hydroxide particles 163*b* is reduced to 15 wt % or less.

As described above, the content rate of the small-diameter nickel hydroxide particles 163*b* each having a particle diameter of 5 µm or less should reduced to 15 wt % or less and the relation of C/B≧0.6 should be established to achieve a battery with a good current collecting property and good life characteristics.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A battery comprising a positive electrode plate including:
   a positive electrode substrate made of nickel and including a nickel skeleton of a three-dimensional network structure having a void part formed of a number of pores three-dimensionally connected, the positive electrode substrate having a front surface and a back surface, and
   a nickel hydroxide particle group including a number of nickel hydroxide particles filled in the void part of the positive electrode substrate;
   wherein the nickel hydroxide particle group includes, at a ratio of 15 wt % or less, nickel hydroxide particles each having a particle diameter of 5 μm or less, and
   the positive electrode substrate is configured such that, when the positive electrode substrate is divided into five regions in a thickness direction, a region closest to a positive-electrode-substrate front surface is a front-surface-side nickel portion, a region closest to a positive-electrode-substrate back surface is a back-surface-side nickel portion, and a middle region is a middle nickel portion,
   a front-surface-side nickel layer forming the nickel skeleton of the front-surface-side nickel portion and a back-surface-side nickel layer forming the nickel skeleton of the back-surface-side nickel portion are larger in thickness than a middle nickel layer forming the nickel skeleton of the middle nickel portion, and
   an average thickness B of a thicker one of either the front-surface-side nickel layer or the back-surface-side nickel layer, and an average thickness C of the middle nickel layer, satisfy a relation of $0.6 \leqq C/B \leqq 0.9$.

2. The battery according to claim 1, wherein each of the nickel hydroxide particles contains magnesium in a solid solution state in a crystal of the nickel hydroxide particle.

* * * * *